United States Patent [19]
Mizoguchi

[11] Patent Number: 5,719,641
[45] Date of Patent: Feb. 17, 1998

[54] VOD RECEPTION WITH DEMODULATION AND QUANTIZATION HELD DURING CARRIER SWITCHING TO PRODUCE A VIDEO SIGNAL BEFORE THE CARRIER SWITCHING

[75] Inventor: Shoichi Mizoguchi, Tokyo, Japan

[73] Assignee: NEC Corporation, Tokyo, Japan

[21] Appl. No.: 546,172

[22] Filed: Oct. 20, 1995

[30] Foreign Application Priority Data

Oct. 20, 1994 [JP] Japan .................................... 6-254914

[51] Int. Cl.$^6$ ..................................................... H04N 5/21
[52] U.S. Cl. ............................. 348/607; 348/11; 348/7; 455/4.2
[58] Field of Search ........................... 348/11, 7, 10, 348/12, 13, 607, 608, 731; 455/4.2, 6.1; H04N 5/21

[56] References Cited

U.S. PATENT DOCUMENTS

| | | | |
|---|---|---|---|
| 3,916,093 | 10/1975 | Parker | 178/5.8 |
| 4,047,226 | 9/1977 | Hedges | 358/193 |
| 4,771,456 | 9/1988 | Martin et al. | 348/11 |
| 5,485,198 | 1/1996 | Källström | 348/11 |

FOREIGN PATENT DOCUMENTS

| | | | |
|---|---|---|---|
| A 56-78243 | 6/1981 | Japan | H04B 3/06 |
| A 58-56952 | 4/1983 | Japan | H04L 27/00 |
| A 4369932 | 12/1992 | Japan | H04B 31/23 |
| 2 090 501 | 7/1982 | United Kingdom | H04N 5/48 |

*Primary Examiner*—Glenton B. Burgess
*Attorney, Agent, or Firm*—Sughrue, Mion, Zinn, Macpeak & Seas

[57] ABSTRACT

Supplied with carrier and channel selection signals in a VOD receiver from a remote control data processor from a remote control switch, a switching control circuit produces demodulation and equalization control signals substantially concurrently with carrier switching started by the carrier selection signal. In response, a demodulator and a digital transversal equalizer are held in a held state. Immediately after completion of the carrier switching, the demodulator and the equalizer are turned back to an automatically controlled state to be operable with synchronism kept. While demodulation and equalization are held, a digital signal processor produces a receiver output video signal for standstill picture scenes. Immediately upon turn back of the demodulation and the equalization, the channel selection signal makes the output video signal represent moving picture scenes. The digital transversal equalizer may be an analog one connected to the demodulator.

11 Claims, 4 Drawing Sheets

VOD RECEPTION WITH DEMODULATION AND QUANTIZATION HELD DURING CARRIER SWITCHING TO PRODUCE A VIDEO SIGNAL BEFORE THE CARRIER SWITCHING

BACKGROUND OF THE INVENTION:

This invention relates to VOD (video on demand) reception and, more particularly, to a method and apparatus for receiving an input radio signal which is received through a transmission path and which comprises a plurality of frequency multiplexed carrier signals with each carrier signal being composed of a plurality of multiplexed digital sequences of different channels. It should be noted in that throughout this specification, a digital signal sequence refers to a digital video signal sequence including synchronization signals and other information which is necessary for communication.

A digital video transmitting system has recently been put into practice in order to provide a VOD service. The digital video transmitting system must deal with transmission in narrow band and of large capacity. A digital modulation system of a high efficiency in frequency use is therefore used, such as sixteen-level quadrature amplitude modulation (16 QAM) or 32-level quadrature amplitude modulation (32 QAM). Such a multi-level modulating system is, however, susceptible to amplitude distortion and a group delay distortion caused in the transmission path. The presence of such distortions gives rise to serious transmission error. It should be noted here that the digital video transmission relies on compression encoding, as by an MPEG (moving pictures experts group) system. As a consequence, occurrence of even a slight error in the transmission path results in a considerably continuous error in decoded data which deteriorates video quality.

In a manner which will later be described in greater detail, a conventional digital video receiver of the above-described type is put into operation by a remote control switch or transmitter. When manipulated by a user who desires to watch a selected program, the remote control switch transmits to the digital video receiver a channel indication control signal indicative of one of the channels of the input radio signal that comprises a desired signal sequence of the selected program among the digital signal sequences.

The radio receiver comprises a carrier selecting circuit responsive to a carrier selection signal which will presently be described together with a channel selection signal. Responsive to the carrier selection signal, the carrier selecting circuit selects from the afore-mentioned carrier signals a selected carrier signal which includes the desired signal sequence.

Supplied with the selected signal sequence, a carrier signal processing unit processes the selected carrier signal, usually in an automatically Controlled State. The carrier signal processing unit produces a processed signal which is free from distortions introduced in the transmission path into the input radio signal.

In practice, the carrier signal processing unit comprises a demodulator responsive to the selected carrier signal for producing a digital baseband signal and a digital transversal equalizer for removing the distortions and for producing the processed signal. The transversal equalizer is described in various text books and is disclosed in Japanese Patent Prepublications (A) Nos. 78,243 of 1981, 59,652 of 1983, and 369,932 of 1992.

Controlled by the channel selection signal, a digital signal processor processes the processed signal into a digital output video signal which serves as the decoded data described in the foregoing. Pictures are reproduced from the output video signal to be watched by the user.

To be controlled by the remote control switch, the digital video receiver comprises a remote control receiver for receiving the channel indication control signal as a received channel indication control signal. A data or control signal processor processes the received control indication control signal into the carrier and the channel selection signals.

In the digital video receiver described above, the carrier selecting circuit does not instantaneously supply the demodulator input signal to the demodulator upon switching of the carrier, namely, from a previously desired carrier signal to a fresh desired carrier signal. This gives rise an out of synchronism condition between the demodulator and the digital transversal equalizer. If it takes a long time to pull operation of the demodulator and the transversal equalizer into synchronism, the output video signal meanwhile gives rise to disturbances to pictures.

SUMMARY OF THE INVENTION

It is consequently an object of the present invention to provide a digital video signal receiving method for receiving an input radio signal received through a transmission path and comprising a plurality of frequency multiplexed carrier signals with each carrier signal composed of a plurality of multiplexed digital signal sequences of different channels and in which the channels are interswitched without giving rise to no disagreeable disturbances of successive picture scenes being reproduced.

It is another object of this invention to provide a digital video signal receiving method which is of the type described and in which no loss of synchronism takes place, on interswitching the carrier signals, between a demodulator and a transversal equalizer used in the digital video signal receiving method.

It is still another object of this invention to provide a digital video signal receiving method which is of the type described and in which no loss of synchronism takes place between the demodulator and the transversal equalizer on interswitching the channels.

It is yet another object of this invention to provide a digital video receiver for implementing the digital video signal receiving method of the type described.

Further objects of this invention will become clear as the description proceeds.

In accordance with an aspect of this invention, there is provided a digital video signal receiving method for receiving an input radio signal received through a transmission path and comprising a plurality of frequency multiplexed carrier signals with each carrier signal composed of a plurality of multiplexed digital signal sequence of different channels, the radio signal received being controlled by a remote control switch for producing a channel indication control signal indicative of a desired channel of one of the channels for a desired signal sequence of the digital signal sequences, said method comprising the steps of: (a) responding to a carrier selection signal with carrier switching for selecting from the carrier signals a selected carrier signal including the desired signal sequence, (b) carrier signal processing the selected carrier signal in an automatically controlled state into a processed signal free from distortions introduced from the transmission path into the input radio signal, (c) digital signal processing the processed signal in response to a channel selection signal into an output video signal, (d) receiving the channel indication control signal as a received channel indication control signal, and (e) control signal processing the received channel indication control signal into the carrier and the channel selection signals, wherein the digital video signal receiving method further comprises the steps of: (A) producing a signal processing control signal in response to the carrier and the channel selection signals; and (B) controlling the carrier signal processing step by the signal processing control signal to first hold the carrier signal processing step during carrier switching in a held state of continuing production of the processed signal produced before carrier switching and to subsequently put the carrier signal processing step in the automatically controlled state for producing the processed signal after carrier switching.

In accordance with a different aspect of this invention, there is provided a digital video receiver for receiving an input radio signal received through a transmission path and comprising a plurality of frequency modulated carrier signals with each carrier signal composed of a plurality of multiplexed digital signal sequences of different channels, the radio signal received being controlled by a remote control switch for producing a channel indication control signal indicative as a desired channel of one of the channels for a desired signal sequences of the digital signal sequences, and said receiver comprising (a) a carrier selecting circuit responsive to a carrier selection signal for carrier switching for selecting from the carrier signals a selected carrier signal including the desired signal sequence, (b) carrier signal processing means for processing the selected carrier signal in an automatically controlled state into a processed signal free from distortions introduced from the transmission path into the input radio signal, (c) a digital signal processor responsive to a channel selection signal for processing the processed signal into an output video signal, (d) a remote control receiver for receiving the channel indication control signal as a received channel indication control signal, and (e) a data processor for processing the received channel indication control signal into the carrier and the channel selection signals, wherein the digital video receiver further comprises a signal processor control circuit responsive to the carrier and the channel selection signals for supplying the carrier signal processing means with a signal processor control signal for first holding the carrier signal processing means during the carrier switching in a held state of continuing production of the processed signal produced before the carrier switching and for subsequently putting the carrier signal processing means into the automatically controlled state of producing the processed signal after the carrier switching.

DESCRIPTION OF THE PREFERRED EMBODIMENTS

Figure 1:
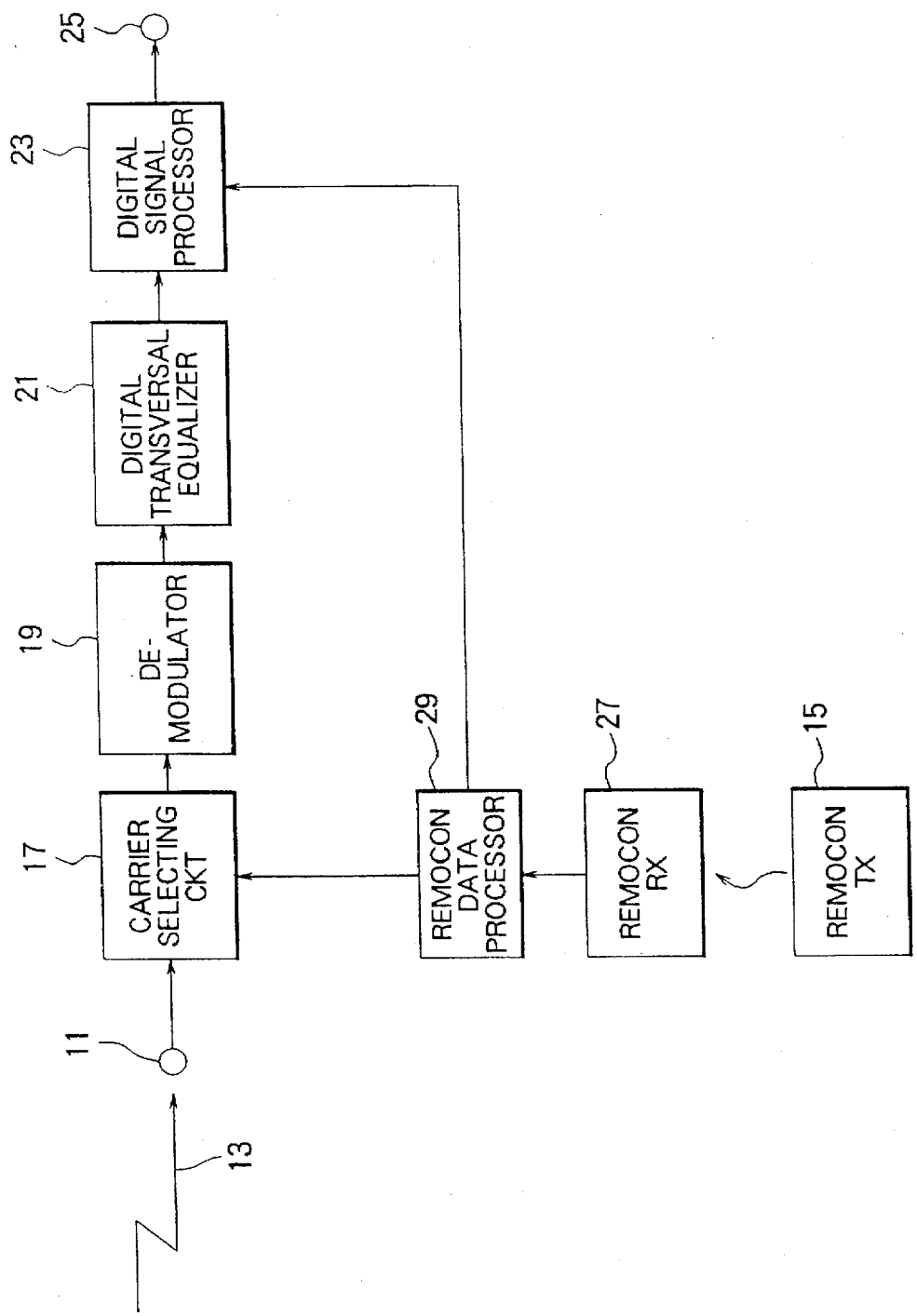
FIG. 1 is a block diagram of a conventional digital video receiver.

Referring to FIG. 1, a conventional digital video receiver will first be described in order to facilitate an understanding of the present invention. The digital video receiver has a receiver input terminal 11 supplied as an input radio signal through a transmission path 13 with a transmission radio signal which is frequency multiplexed by a plurality of carrier signals as by PSK (phase shift keying) or by QAM in the manner which will presently be illustrated. As an example of frequency multiplexing, fifty carriers are multiplexed in a 300-MHz band of a range between 400 MHz and 700 MHz with a band of 6 MHz used per carrier. Each carrier signal is time division multiplexed by a plurality of channel signals of different channels. Each channel signal represents a video digital signal sequence. Such an input radio signal is subjected, while transmission through the transmission path 13, to a amplitude distortion and/or a group delay distortion.

The digital radio receiver is controllably put into operation by a remote control switch 15 which may alternatively be referred to as a remote control (REMOCON) transmitter and is manipulated by a user who desires to watch a desired program. Manipulated, the remote control switch 15 produces typically an infrared-ray signal which controls on and off of the digital video receiver and serves as a channel indication control signal for making the digital video receiver visually display successive picture scenes of the desired program. The channel indication control signal therefore indicates, as a desired channel, one of the channels of the input video signal that comprises a desired signal sequence for the desired program among the digital sequences.

From the receiver input terminal 11, the input radio signal is delivered to a carrier selecting circuit 17 for dealing with carrier switching for selecting from the carrier signals in response to a carrier selection signal a selected carrier signal which includes the desired signal sequence. The carrier selection signal is delivered to the carrier selecting circuit 17 in the manner which will presently be described.

From the carrier selecting circuit 17, the selected carrier signal is delivered to a demodulator 19 for detecting the selected carrier signal first as an analog baseband signal and for subsequently sampling and quantizing the analog baseband signal into a digital baseband signal. The amplitude and/or the group delay distortions of the input radio signal remains in the digital baseband signal.

From the demodulator 19, a digital transversal equalizer 21 is supplied with the digital baseband signal which has been subjected to the amplitude and/or the group delay distortion. The digital transversal equalizer 21 comprises a built-in transversal filter having tap coefficients adaptively varied, corresponding with variations in frequency characteristics of the transmission path 13 and given frequency characteristics inversely related to those of the transmission path and thereby provide equalization by which the amplitude distortion and the group delay distortion are suppressed. The digital transversal equalizer 21 produces an equalized signal in which the amplitude and the group delay distortions are suppressed.

It is convenient to understand a combination of the demodulator 19 and the digital transversal filter 21 as a carrier signal processing unit. Connected to the carrier selecting circuit 17, the carrier signal processing unit processes the selected carrier signal into the equalized signal which may be called a processed signal which is free from the amplitude and the group delay distortions.

From the carrier signal processing unit or more particularly from the digital transversal equalizer 21, the processed signal is delivered to a digital signal processor 23. Subjecting the processed or the equalized signal to decode processing of error correction and selecting the digital signal sequence of the desired channel in response to a channel selection signal which will shortly be described to indicate the desired channel, the digital signal processor 23 processes the equalized signal into a digital output or video signal. If the equalized signal is band compression encoded, the digital video signal is produced from the equalized signal with the digital signal sequence of the desired channel decoded from an encoded signal which is band compression encoded. In either event, the digital video signal is delivered to a receiver output terminal 25.

It is possible to understand the receiver output terminal 25 as a television receiver. When the television receiver is a digital one, the digital video signal is visually displayed. The user can watch successive picture scenes of the desired channel. It is readily understood by one skilled in the art that the receiver output terminal 25 may also be an analog television receiver.

For control by the remote control switch 15, the digital video receiver comprises a remote control receiver 27. Received by the remote control receiver 27, the channel indication control signal is delivered from the remote control receiver 27 as a received channel indication control signal to a remote control data processor 29.

Data processing the received channel indication signal, the remote control data processor 29 produces the carrier selection signal and the channel selection signal for delivery of the carrier selection signal to the carrier selecting circuit 17 and the channel selection signal to the digital signal processor 23.

It should be noted that in the conventional digital video receiver, it takes an appreciable time interval, such as about 10 milliseconds, for the carrier selecting circuit 17 to carry through the carrier switching. In the meantime, synchronism is lost in operation between the demodulator 19 and the digital transversal equalizer 21 giving rise to disturbances in the output digital sequence at the receiver output terminal 25 if previous and present desired channels are included in different carrier signals. Channel switching must be carried through in the digital signal processor 23 even when the previous and the present desired channels are both included in a currently selected carrier signal. Although shorter than 10 milliseconds, it takes time for the digital signal processor 23 to perform the channel switching. As a consequence, the user suffers from disagreeable disturbances in the successive picture scenes when the user switches between the channels which may belong to either different carrier signals or to the same carrier signal.

Figure 2:
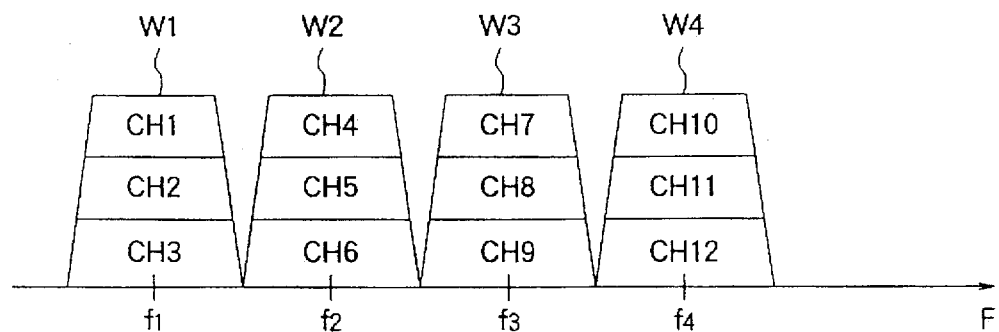
FIG. 2 is a schematic representation of a radio signal supplied to a digital video receiver in general.

Turning to FIG. 2, a frame of the input radio signal has a format schematically depicted with its frequency F scaled along the abscissa. It is assumed that the input radio signal comprises first through fourth carrier signals W1, W2, W3, and W4 which are frequency multiplexed with respective center frequencies f1 through f4. It is further assumed that each carrier signal comprises three channels which are time division multiplexed therein. For clarity of illustration, the three channels are depicted in a vertical succession with each carrier signal depicted as a trapezoid. More particularly, the first carrier signal W1 comprises first through third channels CH1, CH2, and CH3. The second carrier signal W2 comprises fourth through sixth channels CH4, CH5, and CH6. In this manner, each frame comprises the first through the sixth channels CH1 to CH6 and furthermore seventh through twelfth channels CH7 to CH12. Each channel corresponds to a portion, included in the frame, of one of the digital signal sequences. Each digital signal sequence is a video signal sequence including synchronization signals.

Figure 3:
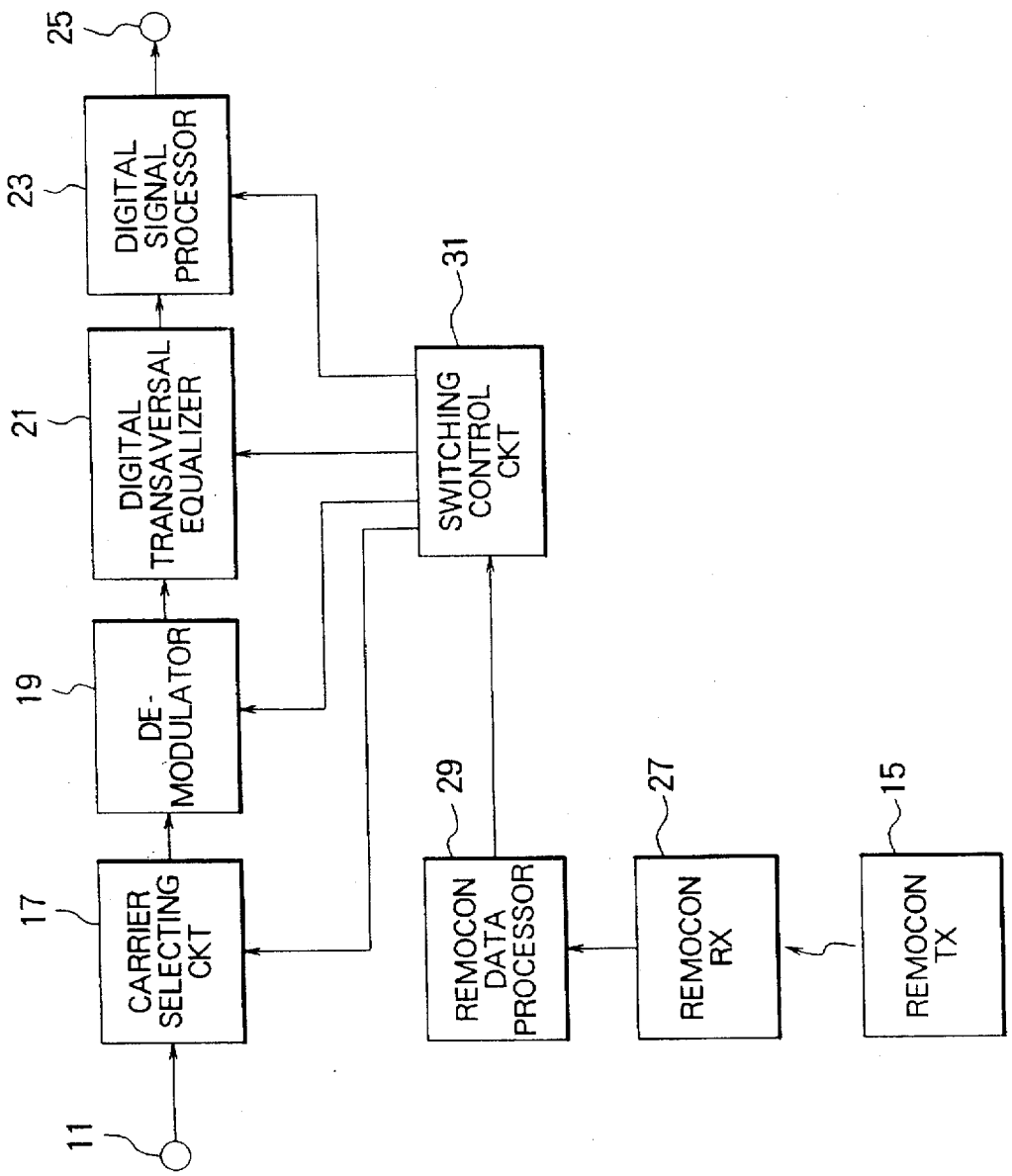
FIG. 3 is a block diagram of a digital video receiver according to a first embodiment of the instant invention.

Referring now to FIG. 3, the description will proceed to a digital video receiver according to a first preferred embodiment of this invention. The digital video receiver comprises similar parts which are designated by like reference numerals and are similarly operable with likewise named signals. Like in FIG. 1, the digital video receiver is controlled by the remote control switch or transmitter 15 which is operable similar to the manner previously disclosed.

In the digital video receiver, the remote control data processor 29 is connected to a switching control circuit 31 used in addition to the elements described in conjunction with FIG. 1. Connected to the remote control data processor 29, the switching control circuit 31 delivers the carrier selection signal to the carrier selecting circuit 17 and the channel selection signal to the digital signal processor 23. Based on the carrier and the channel selection signals delivered from the remote control data processor 29, the switching control circuit 31 produces a signal processing control signal for delivery to the carrier signal processor unit, namely, both to the demodulator 19 and to the digital transversal equalizer 21.

More particularly, the switching control circuit 31 is operable as follows. Before the carrier switching (switching between the carrier signals) at the carrier selecting circuit 17 by the carrier selection signal, the switching control circuit 31 delivers a demodulation control signal to the demodulator 19 and an equalization control signal to the digital transversal equalizer 21. Demodulation by the demodulator 19 and equalization by the digital transversal equalizer 21 are thereby held throughout the carrier switching. After the carrier switching, the demodulator 19 and the transversal equalizer 21 are put back to automatic control.

After completion of the carrier switching so that the demodulator 19 and the transversal equalizer 21 are again automatically controlled, the switching control circuit 31 controls the digital signal processor 23 by the channel selection signal. The output digital signal is thereby made to represent data (a digital bit sequence) for a standstill picture of the channel before the channel switching.

The digital video receiver is operable basically identical with that described in conjunction with FIG. 1. More particularly, the receiver input terminal 11 is supplied with the input radio signal. Selecting the selected carrier signal including the channel desired by the user, the carrier selecting circuit 17 produces the modulated signal.

For example, it will be surmised that the second carrier signal W2 is produced when the fifth channel CH5 is selected from the first through the twelfth channels exemplified in FIG. 2. In the second carrier signal W2, time division multiplexed are the fourth through the sixth channels CH4, CH5, and CH6. Like in the prior art, the digital signal processor 23 produces as the desired digital signal only the signal sequence corresponding to the fifth channel CH5.

Selected by the carrier selecting circuit 17 and including the desired channel (CH5), the selected carrier signal is converted by the demodulator 19 from the analog baseband signal to the baseband digital signal, which is delivered to the digital transversal equalizer 21. Produced by the digital transversal equalizer 21, the equalized signal is delivered to the digital signal processor 23. Produced by the digital signal processor 23, the output digital signal consists of a digital bit sequence and is delivered to the receiver output terminal 25.

In the digital video receiver, switching between the channels proceeds as follows. The switching of channel is indicated by the remote control transmitter 15. To the remote control receiver 27, the remote control transmitter 15 sends a channel indication control signal. In response, the remote control receiver 27 delivers the received channel indication control signal to the remote control data processor 29. Based on the received channel indication control signal, the remote control data processor 29 supplies the switching control circuit 31 with the carrier selection signal and the channel selection signal.

It will now be assumed that the channel should be switched from the fifth channel CH5 to the first channel CH1. It is then necessary to deal with the carrier switching from the second carrier signal W2 to the first carrier signal W1 and the channel switching between the channels, namely, between time slots in the first carrier signal W1. If the carrier switching were first dealt with, the demodulator 19 would be supplied instantaneously with no signal. This would result in a loss in synchronism between the demodulator 19 and the transversal equalizer 21, making it necessary to pull the demodulator 19 and the transversal equalizer 21 into synchronism, which gives rise to disturbances in pictures recovered from the output digital signal. The disturbances in pictures would last during a plurality of frame periods to annoy the user watching the picture scenes particularly when the band compression encoding is applied.

The switching control circuit 31 therefore delivers the demodulation control signal first to the demodulator 19, on making the carrier selecting circuit 17 deal with the carrier switching, substantially concurrently with supply of the carrier selecting circuit 17 with the carrier selection signal indicative of the carrier switching. This keeps (holds) at a current value a control signal for an automatic gain control (AGC) and a DC offset control (DCO) circuit of the demodulator 19. Simultaneously, a tap coefficient control signal is supplied to the digital transversal equalizer 21 to keep (hold) tap coefficients in a reset state where values of 1 and 0 are given to a main tap and to other taps of the transversal filter included in the digital transversal equalizer 21.

After the demodulator and the digital transversal equalizer 21 are put in this manner collectively in a held state, the carrier selection signal completes the carrier switching by the carrier selecting circuit 17 to change the second carrier signal W2 to the first carrier signal W1. Thereafter, the demodulator 19 and the digital transversal equalizer 21 are again put in an automatically operable state to be normally operable in connection with the first carrier signal W1. Finally, the channel selection signal is delivered to the digital signal processor 23 for the channel switching to the first channel CH1 to switch a standstill video output of the fifth channel CH5 to a moving video output of the first channel CH1. In other words, the switching control circuit 31 controls the digital signal processor 23 during the carrier switching and the channel switching to keep the output signal sequence of the digital video signal at a current value as the so-called standstill picture data until automatic control of the demodulator 19 and the digital transversal equalizer 21 is restarted.

With the switching control circuit 31, it is possible to make the digital signal processor 23 produce the output digital signal with the desired channel selected smoothly after completion of the carrier switching at the carrier selecting circuit 17 and to pull the demodulator 19 and the digital transversal equalizer 21 into synchronism. This switching control therefore avoids, on switching from the second carrier signal W2 to the first carrier signal W1, loss of synchronism, enabling the demodulator 19 and the digital transversal equalizer 21 to be rapidly pulled in for the first carrier signal W1 with the user prevented from watching disturbed pictures. The state of the standstill picture lasts only a few scores of milliseconds. This appears to the user as though the switching of channel is very smoothly carried out.

Figure 4:
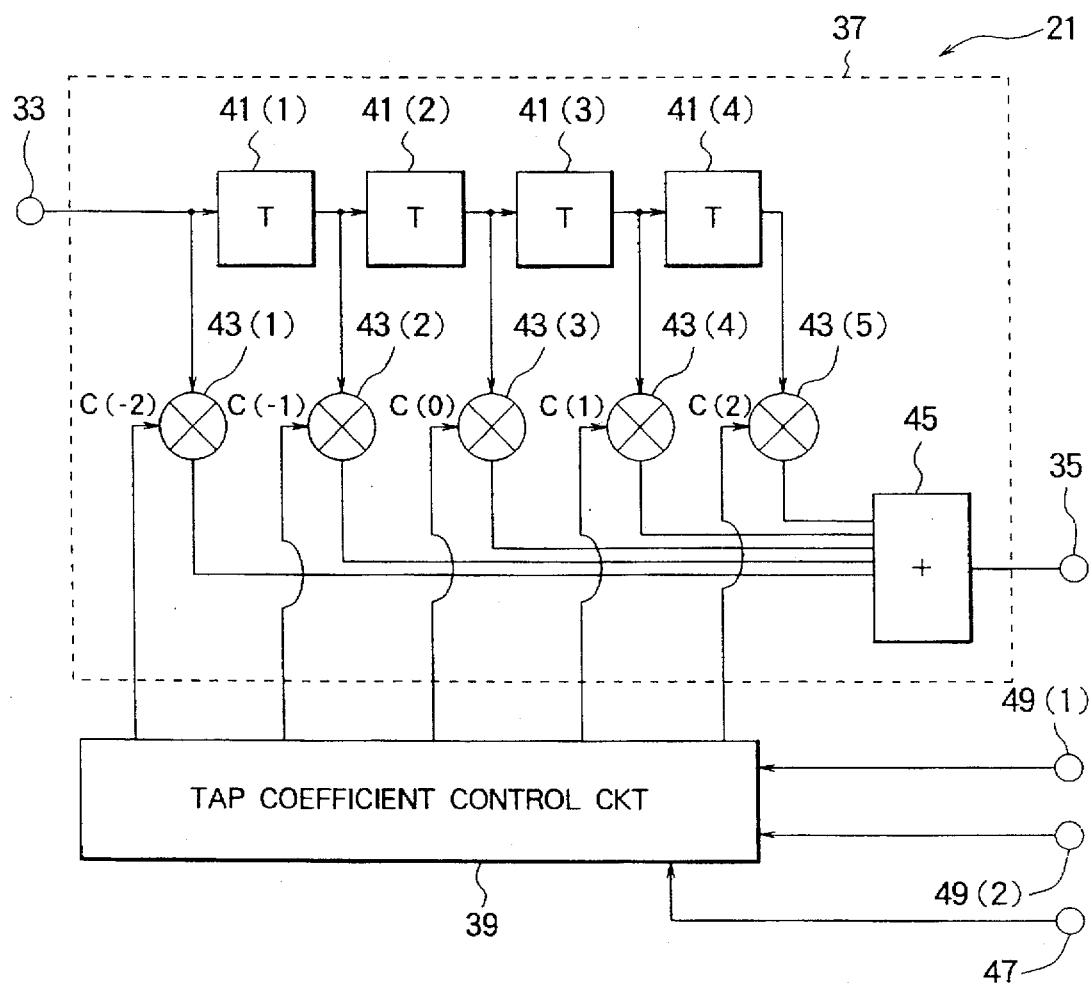
FIG. 4 is a block diagram of a digital transverse equalizer for use in the digital video receiver illustrated in FIG. 3.

Turning to FIG. 4, the digital transversal equalizer 21 is for use in the digital video receiver illustrated with reference to FIG. 3. The digital transversal equalizer 21 has equalizer input and output terminals 33 and 35.

Between the equalizer input and output terminals 33 and 35, the digital transversal equalizer 21 comprises a transversal filter 37. A tap coefficient control circuit 39 controls the transversal filter 37.

In the transversal filter 37, first through fourth flip-flops 41(1) to 41(4) successively give a one-bit delay to the baseband digital signal supplied through the equalizer input terminal 33 from the demodulator 19 described in connection with FIG. 1. First through fifth multipliers 43(1) to 43(5) are connected to taps which are prior and posterior to (input and output sides of) the flip-flops 41(1) to 41(4) and from which taken out are tap signals. An adder 45 is for summing up the tap signals of the flip-flops 41(1) to 41(4) into a sum signal (the equalized signal) for delivery to the equalizer output terminal 35.

To the tap coefficient control circuit 39, connected is a tap coefficient control terminal 47 supplied with a tap coefficient control signal including information of multiplication factors (tap coefficients) C(−2), C(−1), C(0), C(1), and C(2) delivered to the first through the fifth multipliers 43(1) to 43(5) from the switching control circuit 31 described in conjunction with FIG. 3. The tap coefficient control circuit 39 is controlled by first and second distortion control terminals 49(1) and 49(2) which are collectively supplied with a data signal including information necessary for coefficient control as regards the amplitude and the group delay distortions.

The first and the second distortion control terminals 49(1) and 49(2) are supplied with the above-mentioned variations in the transmission path 13 to adaptively vary the tap coefficients in the known manner through the tap coefficient control circuit 39. Alternatively, it is possible to understand that the tap coefficient control circuit 39 and the first and the second control terminals 49(1) and 49(2) are collectively connected to the tap coefficient terminal 47 and to the equalizer input terminal 33 and controls the tap coefficient in compliance with the tap coefficient control signal of the switching control circuit 31 and adaptively in response to the amplitude and the group delay distortion remaining in the digital baseband signal.

Figure 5:
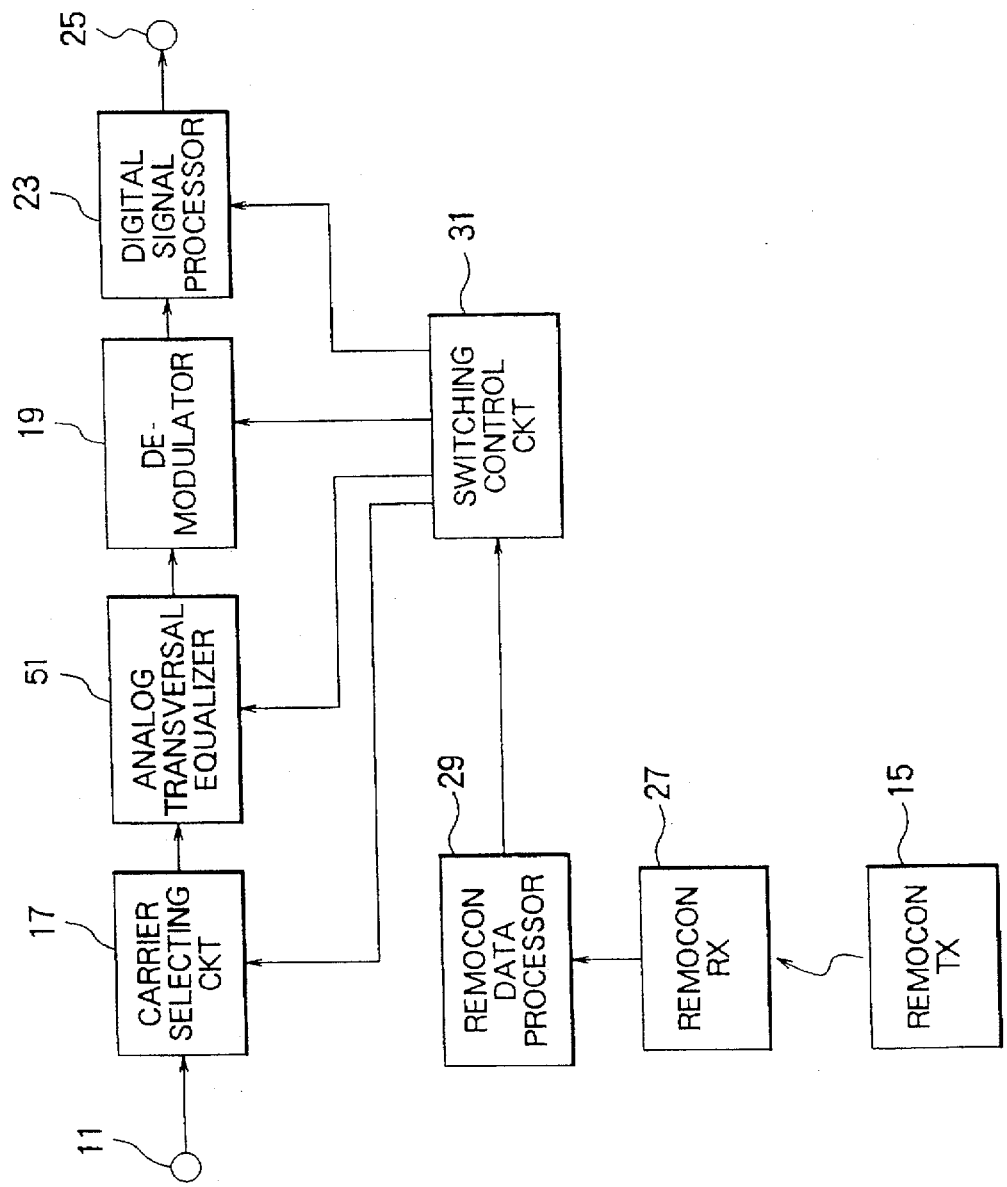
FIG. 5 is a block diagram of a digital video receiver according to a second embodiment of this invention.

Referring to FIG. 5, attention will be directed to a digital video receiver according to a second preferred embodiment of this invention. This digital video receiver comprises similar parts which again are designated by like reference numerals and are similarly operable with likewise named signals when controlled by the remote control transmitter 15.

In FIG. 5, the carrier signal processing unit comprises an analog transversal equalizer 51 in a prior stage and the demodulator 19 in a posterior stage. That is, the digital video receiver comprises the analog transversal equalizer 51 which is supplied with the selected carrier signal to produce an equalized signal devoid of the amplitude distortion and the group delay distortion introduced by the transmission path 13. Demodulating this equalized signal, the demodulator 19 produces the baseband digital signal as the processed signal.

The switching control circuit 31 is operable like in the example described before to deliver the tap coefficient control signal to the analog transversal equalizer 51 substantially concurrently with start of the carrier switching for the carrier selection by the carrier selecting circuit 17. With the demodulation control signal delivered to the demodulator 19, each of equalization by the analog transversal equalizer 51 and demodulation by the demodulator 19 is held in the held state throughout the carrier switching. After completion of the carrier switching, the analog transversal equalizer 51 and the demodulator 19 are turned back to automatic control. Furthermore, the switching control circuit 31 controls the digital signal processor 23 to make the digital signal sequence represent standstill picture data of the digital bit sequence of the channel before the carrier switching until the carrier switching becomes complete to turn the analog transversal equalizer 51 and the demodulator 19 back into the automaticcontrol.

When the analog transversal equalizer 51 is used, the digital video receiver is useful in a high-speed network. It is possible, however, to substitute a digital transversal equalizer for the analog transversal equalizer 51. The analog transversal equalizer 51 is similar in structure to the digital transversal equalizer 21 illustrated with reference to FIG. 4.

As thus far described, the digital video receiver of the present invention makes it possible to hold, substantially simultaneously with start of the carrier switching, demodulation by the demodulator 19 and equalization by a digital or an analog transversal equalizer 21 or 51. Immediately after keeping the digital signal processor 23 in operation of making a digital video signal represent pictures as standstill pictures until the digital or the analog transversal equalizer 21 or 51 and the demodulator 19 resume automatic control, the carrier selecting circuit 17 completes the carrier switching. This prevents the demodulator 19 and the digital or the analog transversal equalizer 21 or 51 from going out of synchronization. As a result, the digital video receiver makes it possible to perform pull in of the carrier processing unit to synchronism, to shorten a time necessary therefor, and to enable a watcher to switch between channels in an agreeable state of stabilized pictures.

While this invention has thus far been described in specific conjunction with only two preferred embodiments thereof, it will now be readily possible for one skilled in the art to put this invention into practice in various other manners. For example, it is possible to make the digital video receiver receive an input radio signal in which a plurality of channels of digital signal sequences are frequency multiplexed in each carrier signal. It is possible to provide a remote control switch, such as 15, which comprises a micro-processor for controlling the channel indication control signal to make the remote control data processor 29 produce the demodulation and the equalization control signals in addition to the carrier and the channel selection signals and to make the conventional digital video receiver as one according to this invention.

What is claimed is:

1. A digital video receiving method for receiving an input radio signal through a transmission path, said radio signal comprising a plurality of frequency multiplexed carrier signals with each carrier signal comprising a plurality of multiplexed digital signal sequences of different channels, said digital video signal receiving method including a remote control switch for producing a channel indication control signal corresponding to the channel of a desired signal sequence of said digital signal sequences, said method comprising the steps of:

responding to a carrier selection signal with carrier switching to select from said carrier signals a selected carrier signal including said desired signal sequence;

carrier signal processing said selected carrier signal in an automatically controlled state to provide a processed signal which is free from distortions caused by said transmission path;

digital signal processing said processed signal in response to a channel selection signal to provide an output video signal;

receiving said channel indication control signal as a received channel indication control signal;

control signal processing said received channel indication control signal into said carrier and said channel selection signals;

producing a signal processing control signal in response to said carrier and said channel selection signals; and controlling said carrier signal processing step by said signal processing control signal to hold said carrier signal processing step during said carrier switching in a held state of continuing production of a prior processed signal produced before said carrier switching, and to put said carrier signal processing step into said automatically controlled state for producing said processed signal after said carrier switching.

2. A digital video signal receiving method as claimed in claim 1, said carrier signal processing step comprising the steps of:

demodulating said selected carrier signal in said automatically controlled state into a baseband digital signal; and digitally equalizing said digital baseband signal with regard to said distortions during said automatically controlled state to provide said processed signal, wherein said producing step produces a demodulation and an equalization control signal collectively as said signal processing control signal in response to said carrier and said channel selection signals, wherein said controlling step includes controlling said demodulating and said equalizing steps by said demodulation and said equalization control signals, respectively, to hold said demodulating and said equalizing steps in a held state of continuing production of the prior processed signal produced before said carrier switching, and to put said demodulating and said equalizing steps into said automatically controlled state for producing said processed signal after said carrier switching.

3. A digital video signal receiving method as claimed in claim 2, wherein said digital signal processing step is controlled by said channel selection signal to continue producing, during said carrier switching, a prior output video signal produced before said carrier switching, and to produce, after said carrier switching, the output video signal produced in response to said processed signal.

4. A digital video signal receiving method as claimed in claim 1, said carrier signal processing step comprising the steps of:

analog equalizing said selected carrier signal in said automatically controlled state to provide an equalized signal which is free from said distortions; and demodulating said equalized signal in said automatically controlled state to produce a digital baseband signal as said processed signal, wherein said producing step produces an equalization and a demodulation control signal collectively as said signal processing control signal in response to said carrier and said channel selection signals, and wherein said controlling step includes controlling said analog equalizing and said demodulating steps by said equalization and said demodulation control signals to hold said analog equalizing and said demodulating steps in a held state of continuing production of the prior processed signal produced before said carrier switching, and to put said analog equalizing and said demodulating steps into said automatically controlled sate for producing said processed signal after said carrier switching.

5. A digital video signal processing method as claimed in claim 4, wherein said digital signal processing step is controlled by said channel selection signal to continue producing during said carrier switching, a prior output video signal produced before said carrier switching, and to produce, after said carrier switching, the output video signal produced in response to said processed signal.

6. A digital video receiver for receiving an input radio signal received through a transmission path said radio signal comprising a plurality of frequency multiplexed carrier signals with each carrier signal comprising a plurality of multiplexed digital signal sequences of different channels, said digital video receiver being controlled by a remote control switch for producing a channel indication control signal corresponding to the channel of a desired signal sequence of said digital signal sequences, said receiver comprising:

a carrier selecting circuit, responsive to a carrier selection signal, for performing carrier switching to select from said carrier signals a selected carrier signal including said desired signal sequence;

carrier signal processing means for processing said selected carrier signal in an automatically controlled state to provide processed signal which is free from distortions caused by said transmission path;

a digital signal processor, responsive to a channel selection signal, for processing said processed signal to provide an output video signal;

a remote control receiver for receiving said channel indication control signal as a received channel indication control signal;

a data processor for processing said received channel indication control signal into said carrier and said channel selection signals;

a signal processor control circuit, responsive to said carrier and said channel selection signals, for supplying said carrier signal processing means with a signal processor control signal for holding said carrier signal processing means during said carrier switching in a held state of continuing production of a prior processed signal produced before said carrier switching, and for putting said carrier signal processing means into said automatically controlled state for producing the processed signal after said carrier switching.

7. A digital video receiver as claimed in claim 6, said carrier signal processing means comprising:

a demodulator for demodulating said selected carrier signal in said automatically controlled state into a baseband digital signal; and a digital transversal equalizer for equalizing said baseband digital signal with regard to said distortions in said automatically controlled state to provide said processed signal, and wherein said signal processor control circuit produces a demodulation and an equalization control signal collectively as said signal processor control signal in response to said carrier and said channel selection signals, and controls said demodulator and said digital transversal equalizer by aid demodulation and said equalization control signals, respectively, to hold, during said carrier switching, said demodulator and said digital transversal equalizer in a held state of continuing production of the prior processed signal produced before said carrier switching, and to put said demodulator and said digital transversal equalizer in said automatically controlled state for producing said processed signal after said carrier switching.

8. A digital video receiver as claimed in claim 7, wherein said digital signal processor is controlled by said channel selection signal to continue producing during said carrier switching, a prior output video signal produced before said carrier switching, and to produce, after said carrier switching, the output video signal produced in response to said processed signal.

9. A digital video receiver as claimed in claim 8, wherein said digital transversal equalizer comprises a digital transversal filter, comprising:

a plurality of tap coefficient circuits responsive to said digital baseband signal;

a tap coefficient control circuit, responsive to said equalization control signal and to said digital baseband signal, for supplying said tap coefficient circuits with tap coefficient signals, to produce said processed signal.

10. A digital video receiver as claimed in claim 6, wherein said carrier signal processing means comprises:

an analog transversal equalizer for equalizing, in said automatically controlled state, said selected carrier signal with regard to said distortions to provide an equalized signal;

a demodulator for demodulating, in said automatically controlled state, said equalized signal into said processed signal, wherein said signal processor control circuit produces an equalization and a demodulation control signal collectively as said signal processor control signal in response to said carrier and said channel selection signals, and controls said analog transversal equalizer and said demodulator by said equalization and said demodulation control signals to hold, during said carrier switching, said analog transversal equalizer and said demodulator in a held state of continuing production of the prior processed signal produced before said carrier switching, and to put said analog transversal equalizer and said demodulator in said automatically controlled state for producing said processed signal after said carrier switching.

11. A digital video receiver as claimed in claim 10, wherein said digital signal processor is controlled by said channel selection signal to continue producing, during said carrier switching, a prior output video signal produced before said carrier switching and to produce, after said carrier switching, the output video signal produced in response to said processed signal.

* * * * *